Patented Feb. 24, 1948

2,436,484

UNITED STATES PATENT OFFICE 2,436,484

ISOMERIZATION OF SATURATED HYDROCARBONS

Herman Pines, Chicago, Ill., assignor to Universal Oil Products Company, Chicago, Ill., a corporation of Delaware No Drawing. Application March 28, 1946, Serial No. 657,905

9 Claims. (Cl. 260—683.5)

This invention relates to the catalytic isomerization of isomerizable saturated hydrocarbons and is more specifically concerned with an improved process wherein these hydrocarbons are isomerized under carefully selected conditions of operation in the presence of certain partially hydrogenated polynuclear aromatic hydrocarbons.

The isomerization of saturated hydrocarbons has assumed considerable importance at the present time, particularly the isomerization of normally liquid paraffinic hydrocarbons such as pentane, hexanes, heptanes, etc., which upon isomerization produce compounds which have very desirable antiknock properties when included in aviation gasoline blends and other motor fuels. Moreover, these isomerized products, especially the isomers having at least one tertiary carbon atom per molecule, may be alkylated with an alkylating agent such as an olefin, alcohol, etc., to produce higher molecular weight alkyl derivatives which have very desirable antiknock qualities and which are useful intermediates in organic synthesis.

It is well known that saturated hydrocarbons may be isomerized using catalysts of the Friedel-Crafts type such as aluminum halides, zinc halides, zirconium halides, or mixtures thereof in the presence of a hydrogen halide. The primary operating difficulty accompanying these isomerization operations is the tendency toward high catalyst consumption due to the formation of metal halide-hydrocarbon complexes. The catalyst complexes or sludges are formed by the interaction of the metal halide with the products of decomposition reactions which occur simultaneously with the isomerization reaction.

Various methods have been proposed to prevent the decomposition of the saturated hydrocarbons thereby preventing high catalyst consumptions. For example, it has been proposed to introduce hydrogen into the reaction zone to suppress decomposition and presumably to hydrogenate unsaturated hydrocarbon fragments formed by decomposition of the charging stock. The use of hydrogen as a decomposition suppressor has been found to be very expensive and entails the use of a considerable amount of auxiliary equipment such as compressors, separators, etc., to provide a means for recycling the hydrogen to the reaction zone.

It is an object of the present invention to provide a method for suppressing the decomposition of the isomerizable hydrocarbons which is economical and practical and which obviates the difficulties which are inherent in the use of hydrogen.

In one embodiment, the invention comprises a process for isomerizing a saturated hydrogen by contacting said hydrocarbon with an isomerizing catalyst under isomerization conditions in the presence of a relatively minor amount of a partially hydrogenated polynuclear aromatic hydrocarbon.

In a more specific embodiment the invention consists of an isomerization process which comprises contacting a normally liquid paraffin hydrocarbon with a Friedel-Crafts type isomerizing catalyst under isomerizing conditions and in the presence of a partially hydrogenated polynuclear aromatic hydrocarbon.

I have discovered that the addition of these partially hydrogenated polynuclear aromatic hydrocarbons selectively suppresses the decomposition reactions and permits the isomerization of the saturated hydrocarbons with a high degree of efficiency and low catalyst consumption. The exact mechanism by which the polynuclear aromatics suppress decomposition reactions is not thoroughly understood, but it will be evident from the experimental data hereinafter presented that greatly improved results are obtained when these hydrocarbons are present.

The hydrocarbons which may be employed to suppress decomposition reactions during the isomerization of saturated hydrocarbons comprise broadly those hydrocarbons containing at least one partially hydrogenated polynuclear aromatic group.

Examples of these compounds are tetralin, hydrindene, di- and octahydroanthracene, and di- and octahydrophenanthrene. Alkyl and aryl derivatives of these and similar compounds also may be employed.

The various partially hydrogenated polynuclear aromatics are not necessarily equivalent in their effectiveness since obviously different amounts of suppressor may be required dependent upon the nature of the catalyst and charging stock and also upon the operating conditions employed. The concentration of the suppressor in the isomerization charging stock is generally from about 0.1% to about 5% by weight. The use of the above mentioned partially hydrogenated aromatic hydrocarbons to suppress decomposition reactions is particularly applicable to the isomerization of normal pentane and normal hexane because these particular hydrocarbons exhibit an unusual tendency to undergo decomposition when subjected to isomerizing conditions. The various partially hydrogenated polynuclear aromatics are separated from the isomerization reaction products by fractionation or other suitable means and may be recycled to the isomerization step.

The operating conditions of the isomerization process such as temperature and pressure will vary somewhat depending upon the charge stock and catalyst employed. Ordinarily, temperatures within the range of about 50° F. to about 350° F. and more preferably within the range of from about 120° F. to about 250° F. and pressures varying from substantially atmospheric to about 500 pounds per square inch or more are desirable.

Any of the isomerization catalysts, such as boron trifluoride-hydrogen fluoride-nickel, the reaction product of aluminum chloride and phosphoric acid, and the like, may be employed but the preferred isomerization catalysts are those of the Friedel-Crafts type. In the following discussion it is to be understood that the term catalyst means those of the Friedel-Crafts type. It is desirable that a hydrogen halide such as hydrogen chloride and hydrogen bromide be used in conjunction with these catalytic materials. The ordinary concentration of the hydrogen halide is within the range of about 1 to about 40 mol per cent of the charge and preferably from about 5 to about 20 mol per cent. The preferred catalysts comprise the chlorides and bromides of aluminum, zinc, zirconium, and iron, either alone or in admixture with one another. These catalysts may be employed in the solid granular state or upon inert supporting materials such as alumina, silica, thoria, crushed firebrick, quartz, activated clays, and activated chars.

It is also within the scope of this invention to employ mixtures of these compounds and in particular the aluminum halides with the halides of antimony, bismuth, and arsenic, to form catalyst composites which are molten under the conditions of operation.

The isomerization operation may be conducted in various ways. For example, the heated hydrocarbon charge, which may be a naphthene but which is preferably a normal paraffin, containing the added partially hydrogenated polynuclear aromatic, may be passed either in the liquid, vapor, or mixed phase through a reaction zone containing a bed of solid granular catalyst either supported or unsupported, and the reaction product may be separated into the desired isomers and unconverted material and the latter recycled to the reaction zone.

Another method of operation consists of employing a catalyst supply chamber containing a bed of granular catalyst through which a stream of the charge is passed in liquid phase to dissolve the required amount of catalyst. This catalyst-containing stream is introduced into a reaction zone along with a regulated amount of the hydrogen halide, and a substantial portion of the hydrocarbon is isomerized therein. This reaction zone may comprise a large vessel which will provide sufficient time for the reaction to occur or it may be filled with a retaining material, such as molten salts, hydrocarbon-metal halide complexes, or solid packing materials such as bauxite, Raschig rings, berl saddles, granular quartz and other materials well known to those skilled in the art.

The following examples illustrate in a general way the effectiveness of the partially hydrogenated polynuclear aromatic hydrocarbons disclosed herein in suppressing decomposition reactions during the isomerization operation. It is not intended that these examples unduly limit the generally broad scope of this invention.

A series of experiments was conducted to investigate the effect of tetralin and dihydroanthracene in the normal pentane isomerization reaction. An electrically heated autoclave equipped with a mechanical stirrer was charged with 85 grams of normal pentane and the designated amount of aromatic, and anhydrous aluminum chloride and hydrogen chloride were added. The autoclave was sealed and the reaction was carried out for a period of six hours. A blank run was also made without the addition of an aromatic to suppress decomposition reactions. The pertinent data from these tests are tabulated as follows:

| Run No | 1 | 2 | 3 |
|---|---|---|---|
| Charge, grams: | | | |
| Aluminum chloride | 15 | 15 | 15 |
| Hydrogen chloride | 2.8 | 2.8 | 3.1 |
| n-Pentane | 85 | 85 | 85 |
| Tetralin | 0 | 2.0 | 0 |
| Dihydroanthracene | 0 | 0 | 2.0 |
| Temperature, °C | 75 | 75 | 75 |
| Maximum pressure, p. s. i. gage | 110 | 63 | 70 |
| Time, hours | 6 | 6 | 6 |
| Analysis of product, Mol percent: | | | |
| i-Butane | 54.1 | 7.9 | 6.3 |
| n-Butane | 8.1 | 0.8 | 0.5 |
| i-Pentane | 19.2 | 52.4 | 49.7 |
| n-Pentane | 11.8 | 35.1 | 38.9 |
| Hexane and higher | 6.8 | 3.8 | 4.6 |

In run 1, which was the blank run, it will be noted that although 19.2% isopentane was obtained there was also a total butane production of 62.2% which represents a relatively low efficiency of conversion to isopentane. In run 2 employing tetralin, 52.4% isopentane was obtained with only 8.7% of butane thus indicating the marked effect of tetralin in suppressing decomposition reactions. It will also be noted in run 2 that 35.1% of unconverted normal pentane was recovered which could be recycled for further conversion in a continuous method of operation.

In run 3, dihydroanthracene was employed. Comparing the results of this test with the results obtained in run 1, it will be noted that the presence of the dihydroanthracene suppressed the butane production to a very marked extent and resulted in a high yield of isopentane.

I claim as my invention:

1. An isomerization process which comprises contacting an isomerizable saturated hydrocarbon under isomerizing conditions with an isomerizing catalyst in the presence of a relatively minor amount of a partially hydrogenated polynuclear aromatic hydrocarbon.

2. An isomerization process which comprises contacting a paraffin with a Friedel-Crafts type isomerizing catalyst under isomerizing conditions and in the presence of a partially hydrogenated polynuclear aromatic hydrocarbon.

3. An isomerization process which comprises contacting a normally liquid paraffin with a Friedel-Crafts type isomerizing catalyst under isomerizing conditions and in the presence of a partially hydrogenated polynuclear aromatic hydrocarbon.

4. An isomerization process which comprises contacting a normally liquid paraffin hydrocarbon with a metal halide of the Friedel-Crafts type and a hydrogen halide under isomerizing conditions in the presence of a partially hydrogenated polynuclear aromatic hydrocarbon.

5. An isomerization process which comprises contacting a normally liquid paraffin with aluminum chloride and hydrogen chloride under isomerizing conditions and in the presence of a partially hydrogenated polynuclear aromatic hydrocarbon.

6. The process of claim 2 further characterized in that said partially hydrogenated polynuclear aromatic hydrocarbon comprises a partially hydrogenated naphthalene.

7. The process of claim 2 further characterized in that said partially hydrogenated polynuclear hydrocarbon comprises a partially hydrogenated anthracene.

8. An isomerization process which comprises contacting n-pentane with aluminum chloride and hydrogen chloride under isomerizing conditions and in the presence of a partially hydrogenated polynuclear aromatic hydrocarbon.

9. An isomerization process which comprises contacting n-hexane with aluminum chloride and hydrogen chloride under isomerizing conditions and in the presence of a partially hydrogenated polynuclear aromatic hydrocarbon.

HERMAN PINES.

REFERENCES CITED

The following references are of record in the file of this patent:

UNITED STATES PATENTS

| Number | Name | Date |
| --- | --- | --- |
| 2,382,815 | Sutton et al. | Aug. 14, 1945 |
| 2,404,436 | Crawford et al. | July 23, 1946 |
| 2,406,967 | Pines | Sept. 3, 1946 |